(12) United States Patent
Li

(10) Patent No.: US 7,738,417 B2
(45) Date of Patent: Jun. 15, 2010

(54) COMMUNICATION SYSTEM

(75) Inventor: Jun-Hua Li, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 594 days.

(21) Appl. No.: 11/812,663

(22) Filed: Jun. 20, 2007

(65) Prior Publication Data
US 2007/0297359 A1    Dec. 27, 2007

(30) Foreign Application Priority Data
Jun. 21, 2006    (TW) .............................. 95122220 A

(51) Int. Cl.
*H04Q 7/20* (2006.01)
(52) U.S. Cl. .................. 370/328; 370/340; 370/338; 455/414.1; 709/204
(58) Field of Classification Search ............... 370/338, 370/340, 328; 455/414.1; 709/204
See application file for complete search history.

(56) References Cited

U.S. PATENT DOCUMENTS

| | | | |
|---|---|---|---|
| 6,763,226 B1 | 7/2004 | McZeal, Jr. | |
| 7,536,177 B2 * | 5/2009 | Karaoguz et al. | 455/415 |
| 7,631,039 B2 * | 12/2009 | Eisenberg | 709/204 |
| 2004/0150749 A1 | 8/2004 | Phillips et al. | |
| 2005/0232210 A1 * | 10/2005 | Karaoguz et al. | 370/338 |
| 2005/0232284 A1 * | 10/2005 | Karaoguz et al. | 370/401 |
| 2006/0025132 A1 * | 2/2006 | Karaoguz et al. | 455/433 |
| 2007/0019545 A1 * | 1/2007 | Alt et al. | 370/230 |

\* cited by examiner

*Primary Examiner*—Danh C Le
(74) *Attorney, Agent, or Firm*—Winston Hsu

(57) ABSTRACT

The present invention provides a communication system which includes a mobile communication apparatus, a modem, a gateway server, and a program processing apparatus. In addition, the communication system according to the present invention integrates mobile communication and instant messaging. More particularly, the communication system of the present invention is capable of providing an instant messaging user and a mobile communication user to perform instant video communication.

11 Claims, 1 Drawing Sheet

COMMUNICATION SYSTEM

BACKGROUND OF THE INVENTION

1. Field of the Invention

Figure 1:
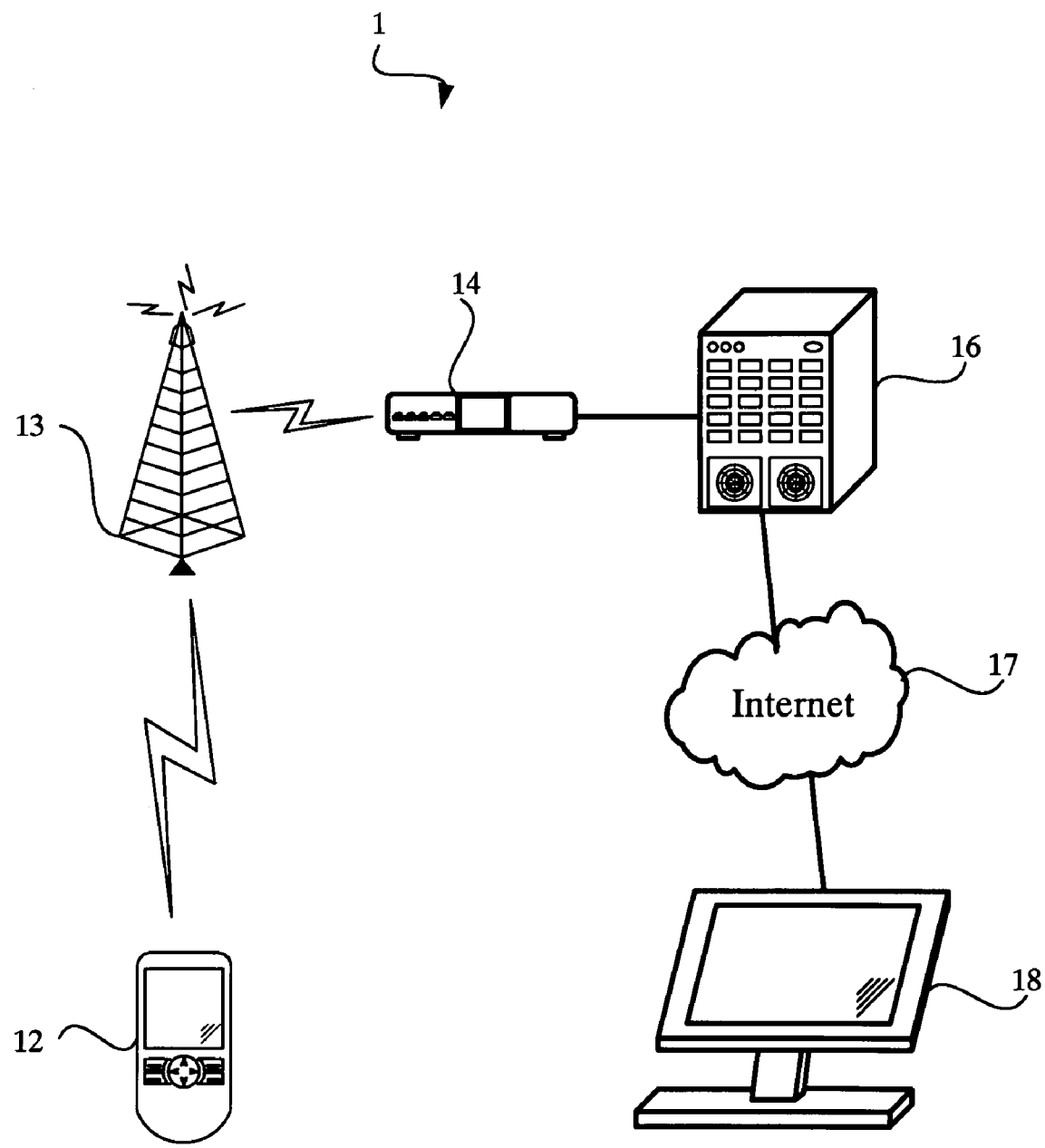

The present invention relates generally to a communication system, more particularly, to a communication system integrated with mobile communication and instant messaging.

2. Description of the Prior Art

Instant messaging software is one of the popular network-related products. According to related reports, the market size of instant messaging software reaches 4,200,000,000, and the number of user break through a hundred million. Recently, many instant messaging-related applications have been developed, such as MSN Messenger, Yahoo Messenger, and Skype. Additionally, instant messaging software has the advantages of instantaneity, convenience, and entertainment.

Through the above-mentioned instant messaging software, users can send text or voice message via internet to communicate with each other. Moreover, with the increase of transmitting speed and popularity of webcam, the instant messaging software can combine the webcam to perform instant video communication.

In another aspect, mobile communication has been an important way of communication in modem life. With the development of related technologies, handheld mobile communication apparatus, such as mobile phone, can perform instant video communication. However, because the number of owners is small, related applications of instant video communication of mobile communication apparatus is not popular.

Recently, the combination of instant communication and mobile communication focuses on the application of text and voice, such as transmitting a text message in short message service (SMS) type from the instant communication end to the mobile communication end or transmitting a voice message in VoIP type from the instant communication end to the mobile communication end. However, the real time feeling of text and voice communication is less than that of video communication.

SUMMARY OF THE INVENTION

Accordingly, an aspect of the present invention is to provide a communication system, and more particularly, the invention is related to a communication system integrated with mobile communication and instant messaging, and the communication system can provide an instant messaging user and a mobile communication user to perform instant video communication.

In a preferred embodiment of the invention, the communication system includes a mobile communication apparatus, a modem, a gateway server, and a program processing apparatus. The communication system is used to provide a first user to perform instant video communication with a second user.

The mobile communication apparatus is applied for generating a first video data stream related to the first user by operation of the first user, and transmitting the first video data stream to the modem via a mobile communication network. Additionally, the mobile communication apparatus receives a second video data stream related to the second user via the mobile communication network from the modem. Particularly, the first video data stream has a first communication protocol, and the second video data stream also has the first communication protocol.

The modem is used to receive the first video data stream via the mobile communication network, and transmit the first video data stream to the gateway server. Additionally, the modem is also used to receive the second video data stream from the gateway server, and transmit the second video data stream to the mobile communication apparatus via the mobile communication network.

Furthermore, the gateway server is used to receive the first video data stream from the modem, and convert the first video data stream to a third video data stream related to the first user. The gateway server further transmits the third video data stream to the program processing apparatus via an internet. Moreover, the gateway server is also used to receive a fourth video data stream from the program processing apparatus, and convert the fourth video data stream to the second video data stream. The gateway server further transmits the second video data stream to the modem. Particularly, the third video data stream has a second communication protocol, and the fourth video data stream also has the second communication protocol.

The program processing apparatus is used to perform an instant messaging program, and generate the fourth video data stream related to the second user by operation of the second user. The program processing apparatus also transmits the fourth video data stream to the gateway server via the internet, and receives the third video data stream related to the first user from the gateway server.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 1 shows a communication system of a preferred embodiment of the invention.

DETAILED DESCRIPTION OF THE INVENTION

The invention provides a communication system which is integrated with mobile communication and instant messaging, therefore, the communication system of the invention can provide an instant messaging user and a mobile communication user to perform instant video communication. The preferred embodiment of the invention is disclosed as follow.

Please refer to FIG. 1, which shows a communication system of a preferred embodiment of the invention. The communication system 1 can provide a first user (not shown) to perform instant video communication with a second user (not shown). Moreover, as shown in FIG. 1, the communication system 1 includes a mobile communication apparatus 12, a modem 14, a gateway server 16, and a program processing apparatus 18.

The mobile communication apparatus 12 is used to generate a first video data stream related to the first user by operation of the first user, and transmit the first video data stream to the modem 14 via a mobile communication network 13. The mobile communication apparatus 12 further receives a second video data stream related to the second user from the modem 14 via the mobile communication network 13. It should be noted that both of the above-mentioned first video data stream and the second video data stream have a first communication protocol. In practice, the first communication protocol can be a H.323 communication protocol or a WCDMA communication protocol, and other suitable communication protocol.

The modem 14 is used to receive the first video data stream via the mobile communication network 13, and transmit the first video data stream to the gateway server 16. The modem 14 also can receive the second video data stream from the gateway serve 16, and transmit the second video data stream to the mobile communication apparatus 12 via the mobile communication network 13.

Furthermore, the gateway server 16 is used to receive the first video data stream from the modem 14, and convert the first video data stream to a third video data stream related to the first user, and transmit the third video data stream to the program processing apparatus 18 via an internet 17. The gateway server 16 can further receive a fourth video data stream from the program processing apparatus 18 via the internet 17, and convert the fourth video data stream to the second video data stream, and transmit the second video data stream to the modem 14. It should be noted that both of the above-mentioned third video data stream and the fourth video data stream have a second communication protocol. In practice, the second communication protocol is a session initiation protocol (SIP), or other suitable communication protocol.

The program processing apparatus 18 is applied for performing an instant messaging program, and generating the fourth video data stream related to the second user by operation of the second user, and transmitting the fourth video data stream to the gateway server 16 via the internet 17. Additionally, the program processing apparatus 18 can receive the third video data stream related to the first user from the gateway server 16.

Furthermore, in an embodiment, after the first user uses the mobile communication apparatus to dial a representative number, the mobile communication apparatus can display a preset list with a plurality of names and brevity codes, each of which corresponds to one of the names. Therefore, the first user can dial the brevity code of the name of a person who the first user wants to contact, and instant video communication with the person via the communication system will be performed. Moreover, the contacted person on the list can be the above-mentioned second user, and he/she can operate the program processing apparatus to operate the instant messaging program.

In practice, the mobile communication apparatus can be, but not limit to, a mobile phone and a personal digital assistant (PDA). Additionally, the mobile communication apparatus can support the third generation mobile communication and the global system for mobile communication (GSM). Furthermore, in practice, the mobile communication apparatus can support the general packet radio service (GPRS).

Furthermore, in practice, the mobile communication apparatus further includes a first photographic device and a first processing device. The first photographic device can be used to capture a first image related to the first user, whereas the first processing device can be used to convert the first image to the first video data stream.

In practice, the program processing apparatus is a computer or a PDA. Additionally, in practice, the program processing apparatus further includes a second photographic device and a second processing device. The second photographic device can be used to capture a second image related to the second user, whereas the second processing device can be used to convert the second image to the fourth video data stream.

Obviously, through the gateway server of the invention, the communication system of the invention can provide instant video communication for an instant messaging user and a mobile communication user. More particularly, the communication system of the invention can solve the problem in the prior art that only text and voice message can be sent between a mobile communication user and an instant messaging user. Moreover, the communication system can also solve the problem in the prior art that video communication of the instant messaging program can only be performed between personal computer users, and the video communication of mobile communication can only be performed between mobile communication users.

Although the present invention has been illustrated and described with reference to the preferred embodiment thereof, it should be understood that it is in no way limited to the details of such embodiment but is capable of numerous modifications within the scope of the appended claims.

What is claimed is:

1. A communication system, for providing a first user to perform instant video communication with a second user, the communication system comprising:

a mobile communication apparatus, for generating a first video data stream related to the first user by operation of the first user, and transmitting the first video data stream to a modem via a mobile communication network, and the mobile communication apparatus receiving a second video data stream related to the second user via the mobile communication network from the modem, wherein the first video data stream has a first communication protocol, and the second video data stream has the first communication protocol;

the modem, for receiving the first video data stream via the mobile communication network, and transmitting the first video data stream to a gateway server, and receiving the second video data stream from the gateway server and transmitting the second video data stream to the mobile communication apparatus via the mobile communication network;

the gateway server, for receiving the first video data stream from the modem, and converting the first video data stream to a third video data stream related to the first user, and transmitting the third video data stream to a program processing apparatus via an internet, and the gateway server receiving a fourth video data stream from the program processing apparatus, and converting the fourth video data stream to the second video data stream, and transmitting the second video data stream to the modem, wherein the third video data stream has a second communication protocol, and the fourth video data stream has the second communication protocol; and the program processing apparatus, for performing an instant messaging program, and generating the fourth video data stream related to the second user by operation of the second user, and transmitting the fourth video data stream to the gateway server via the internet, and receiving the third video data stream related to the first user from the gateway server.

2. The communication system of claim 1, wherein the mobile communication apparatus further comprises:

a first photographic device, for capturing a first image related to the first user; and a first processing device, for converting the first image to the first video data stream.

3. The communication system of claim 2, wherein the mobile communication apparatus is a mobile phone or a personal digital assistant (PDA).

4. The communication system of claim 2, wherein the mobile communication apparatus is capable of supporting the third generation mobile communication.

5. The communication system of claim 2, wherein the mobile communication apparatus is capable of supporting the global system for mobile communication (GSM).

6. The communication system of claim 3, wherein the mobile communication apparatus is capable of supporting the general packet radio service (GPRS).

7. The communication system of claim 1, wherein the program processing apparatus further comprises:
- a second photographic device, for capturing a second image related to the second user; and
- a second processing device, for converting the second image to the fourth video data stream.

8. The communication system of claim 7, wherein the program processing apparatus is a computer or a personal digital assistant.

9. The communication system of claim 1, wherein the first communication protocol is a H.323 communication protocol or a WCDMA communication protocol.

10. The communication system of claim 1, wherein the second communication protocol is a session initiation protocol (SIP).

11. The communication system of claim 1, wherein the mobile communication apparatus is capable of providing the first user to dialing a represent number, and when the first user dials the represent number, the mobile communication apparatus is capable of displaying a list with a plurality of contact persons and brevity codes, wherein each of the brevity codes corresponds to one of the contact persons.

* * * * *